United States Patent [19]

Ohte et al.

[11] 4,063,150
[45] Dec. 13, 1977

[54] RESONANCE THERMOMETER

[75] Inventors: Akira Ohte; Hideto Iwaoka; Muneki Araragi, all of Musashino, Japan

[73] Assignee: Yokogawa Electric Works, Ltd., Tokyo, Japan

[21] Appl. No.: 723,144

[22] Filed: Sept. 14, 1976

[30] Foreign Application Priority Data

Sept. 17, 1975 Japan .............................. 50-112784

[51] Int. Cl.$^2$ ......................................... G01R 33/08
[52] U.S. Cl. ............................... 324/.5 R; 73/355 R
[58] Field of Search ............... 324/.5 R, 105, 34 TE, 324/92, 29, 30 R; 73/355, 362; 331/66; 307/310

[56] References Cited

U.S. PATENT DOCUMENTS

| | | | |
|---|---|---|---|
| 3,373,348 | 3/1968 | Vahier | 324/.5 R |
| 3,430,045 | 2/1969 | Bjork et al. | 73/355 R |

Primary Examiner—M. Tokar
Attorney, Agent, or Firm—Parmelee, Johnson, Bollinger & Bramblett

[57] ABSTRACT

A resonance thermometer utilizing nuclear quadrupole resonance, nuclear magnetic resonance or like resonance-absorption phenomenon. The thermometer includes an oscillator for oscillatively detecting a resonance in a resonant material, a means for modulating the oscillation frequency of the oscillator at a low frequency, a first detecting means with a short time constant for detecting a component from the modulated output of the oscillator, and a second detecting means with a long time constant for detecting a component from the modulated output of the oscillator. The oscillator frequency is swept in linear ramp fashion at high speed until an output from the first detecting means occurs, at which point the frequency sweep is stopped. The precise resonance-absorption frequency of the resonant material then is found by using the output of the second detecting means, and the temperature is derived from the precise resonance-absorption frequency.

2 Claims, 6 Drawing Figures

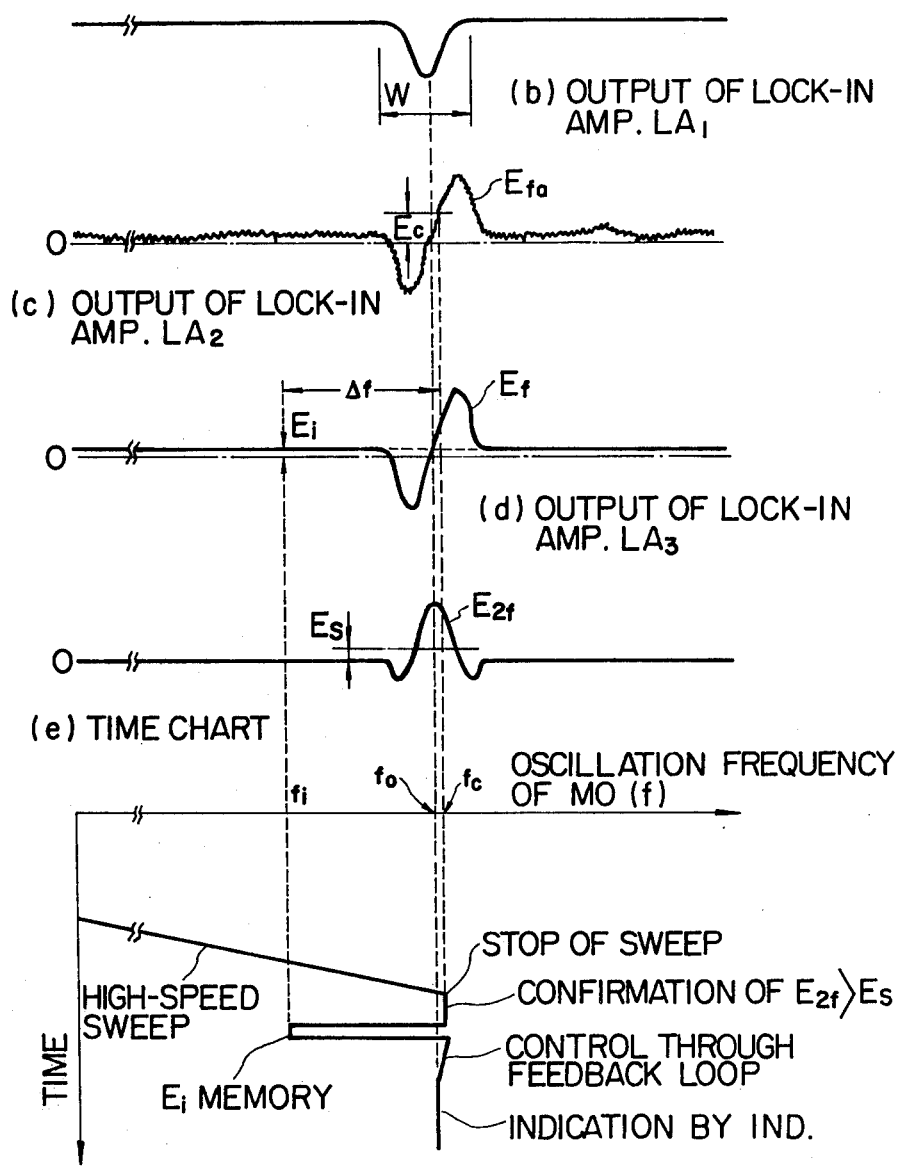

RESONANCE THERMOMETER

BACKGROUND OF THE INVENTION

1. Field of the Invention

The present invention relates to temperature detectors utilizing nuclear quadrupole resonance, nuclear magnetic resonance or like resonance-absorption phenomena.

2. Description of the Prior Art

The nuclear quadrupole resonance-absorption frequency of certain substances is known to depend upon temperature. Such substances include for example the $Cl^{35}$ isotope of Cl in chlorate compounds such as $KClO_3$ or $NaClO_3$. Also, there is temperature dependence of the nuclear magnetic resonance-absorption frequency of the $Cr^{53}$ isotope of Cr in a ferromagnetic compound such as $CrBr_3$, and of an antiferromagnetic substance such as $MnF_2$ or $CrCl_3$. Temperature detectors or thermometers based on such temperature-dependence have been proposed. The present invention relates to improvements in such thermometers.

There have been many studies made of this type of thermometer. One study by G. B. Benedek and T. Kushida entitled "Precise Nuclear Resonace Thermometers", appeared in The Review of Scientific Instruments, Vol. 28, No. 2, pp. 92-95, Feb. 1957. Another study by J. Vanier entitled "Nuclear Quadrupole Resonance Thermometry", appeared in Metrologia, Vol. 1, No. 4, pp. 135-140, Oct. 1965. A number of topics of the resonance thermometer have been discussed by J. Vanier in "Nuclear Magnetic Resonance Thermometry", Temperature — Its Measurement and Control in Science and Industry, Vol. 4, Part 2, pp. 1197-1212, ISA, Pittsburgh, Penna., 1972. U.S. Pat. 3,373,348, to J. Vanier, shows details of one type of thermometer based on such concepts.

Despite this extensive work, prior art techniques have not been capable of providing a practical resonance thermometer as yet. This is chiefly because the absorption signal available is too weak and the absorption frequency too narrow in width, characteristics inherent in the prior art thermometry. This has necessitated the use of highly skilled operators to maintain thermometer functions, and has limited its range of utility.

SUMMARY OF THE INVENTION

It is an object of the invention to provide an improved thermometer utilizing resonance-absorption phenomena. Another object of the invention is to provide a thermometer capable of automatically detecting a resonance-absorption frequency without great delay and yet with high accuracy, and generating an output temperature signal according to the resonance-absorption frequency detected.

Other objects, aspects and advantages of the invention will in part be pointed out in and in part apparent from the following description of a preferred embodiment of the invention, considered together with the accompanying drawings.

BRIEF DESCRIPTION OF THE DRAWINGS

FIGS. 2(a) through 2(e) are diagrams relating to operations of the device shown in FIG. 1, wherein FIG. 2a is a graph showing the amplitude of marginal oscillation;

FIG. 2b is a graph showing the output of the lock-in amplifier $LA_1$;

FIG. 2c is a graph showing the output of the lock-in amplifier $LA_2$;

FIG. 2d is a graph showing the output of the lock-in amplifier $LA_3$; and

FIG. 2e is a time chart illustrating the sequence of operations.

DESCRIPTION OF THE PREFERRED EMBODIMENT

Figure 1:
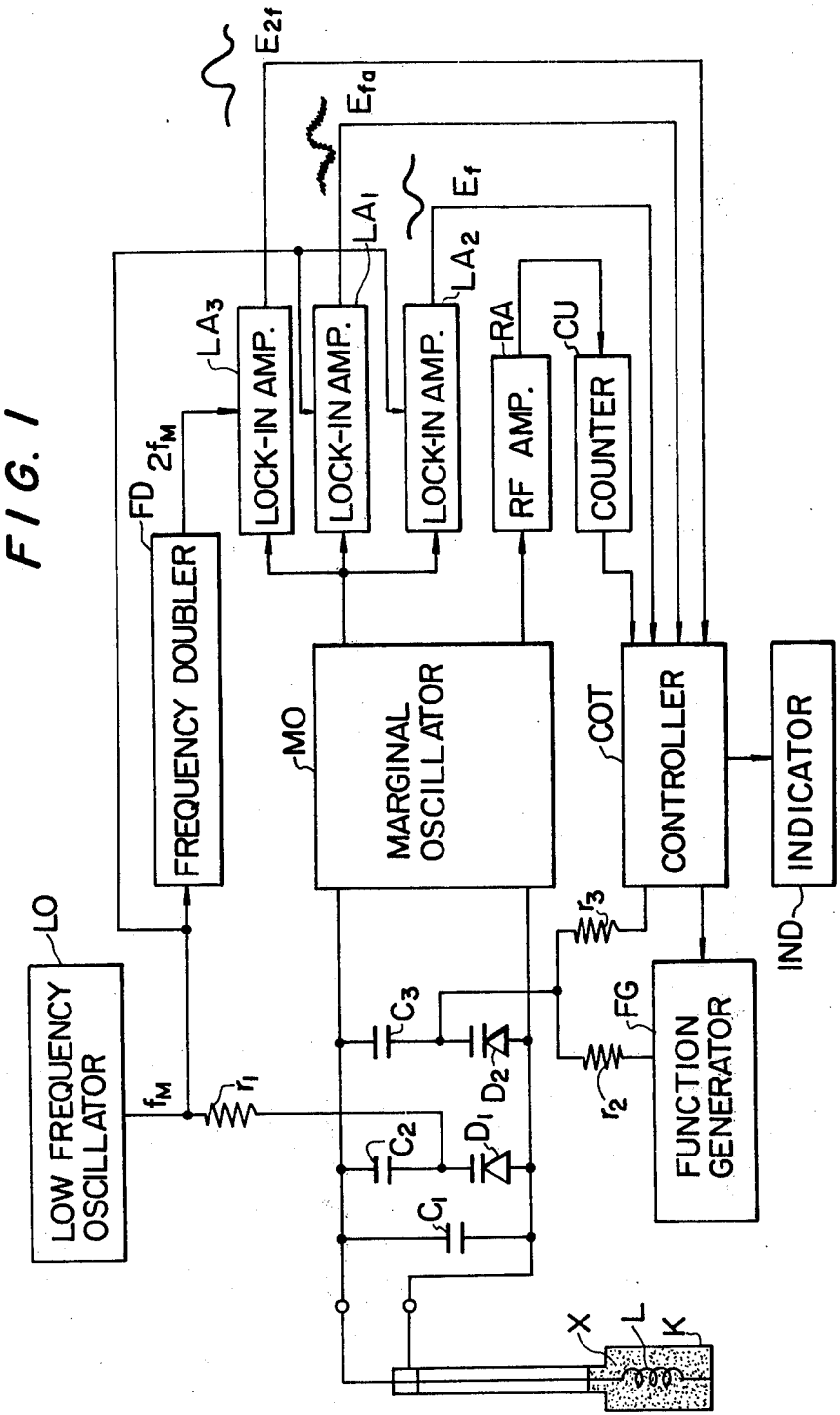
FIG. 1 is a schematic block diagram showing constructional features of one embodiment of the invention.

Referring now to FIG. 1, there is shown a thermometer device comprising a capsule K containing a material X, such as $KClO_3$ or $CrBr_3$, which can set up a resonance absorption phenomenon. A conventional marginal oscillator MO is provided for the material X, and includes a resonant circuit with a coil L in the material X, fixed capacitors $C_1$ through $C_3$, and variable voltage-controlled capacitance diodes $D_1$ and $D_2$. A conventional low frequency oscillator LO, generating a sine wave signal of frequency $f_M$, is coupled to the variable capacitance diode $D_1$ through a resistor $r_1$, to frequency-modulate the signal produced by the marginal oscillator.

The signal of the marginal oscillator MO is directed in parallel to a set of three detectors $LA_1$, $LA_2$ and $LA_3$, referred as lock-in amplifiers, and basically comprising phase-sensitive detection means. (Reference to phase-sensitive detection may also be found in the above-mentioned U.S. Pat. No. 3,373,348.) The first two phase-sensitive detectors $LA_1$ and $LA_2$ are synchronized by the sine wave output of the low-frequency oscillator LO, while the remaining phase-sensitive detector $LA_3$ is synchronized by the output of a frequency-doubler FD, driven by the low-frequency oscillator LO.

A function generator FG produces a ramp output signal which is coupled through an isolation resistor $r_2$ to the voltage-controlled capacitance diode $D_2$ to cause the center frequency of the marginal oscillator MO to sweep at high speed from a lower value towards a higher value. This function generator receives a sweep-start signal, and other appropriate controlling signals (as will be explained) from a Controller COT. During the high-speed sweep of the oscillator MO, the first detector $LA_1$ serves as the initial detector of the resonance frequency, and for this purpose its time constant (e.g., 0.01 second) is shorter than that (e.g., 4.7 seconds) of the other detectors $LA_2$ and $LA_3$. The second detector $LA_2$ serves to make a precise determination of the resonance frequency once its approximate value has been found by the initial detector $LA_1$. The third detector $LA_3$ can be used to confirm the initial detection of resonance.

In FIG. 2, the abscissa stands for the oscillation frequency of the marginal oscillator MO, and waveforms (a) to (d) are plotted on the basis of the abscissa in the time chart (e). As shown in FIG. 2e, the frequency of the marginal oscillator MO ramps upwardly with a sharply rising waveshape. When the oscillation frequency coincides with the resonance-absorption frequency of the material X, the energy produced in the resonant circuit of the marginal oscillator MO is absorbed by the material X, causing the Q of that resonant circuit to be reduced.

The relationship between the oscillation frequency $f$ and the amplitude of the output of the marginal oscillator is shown in FIG. 2a wherein the center frequency $f_o$ corresponds to the resonance-absorption frequency of the material X, and the oscillation amplitude A is reduced at the center frequency $f_o$. This center frequency changes in proportion to temperature, and the absorption frequency width W corresponds to about 0.1° C in temperature, for absorption by $KClO_3$.

During the high-speed sweep of the oscillator frequency, the first detector $LA_1$ generates a signal $E_{fa}$, shown in FIG. 2b when the frequency passes through the resonance region. The detectors $LA_2$ and $LA_3$, with much larger time constants, do not play a part at this stage of the operations. The output $E_{fa}$ represents the fundamental frequency component of the output of the marginal oscillator MO. If instead of a high-speed frequency sweep, the frequency of oscillator MO is varied slowly over the resonance range, the outputs of the other two detectors $LA_2$ and $LA_3$ would be as indicated in FIGS. 2c and 2d. The output signal $E_f$ represents the fundamental frequency component of the output of the marginal oscillator MO, and the output signal $E_{2f}$ is twice the signal $E_f$. It will be understood that the signal-to-noise ratio is considerably higher in the output signals $E_f$ and $E_{2f}$ than in $E_{fa}$.

The output of the initial detector $LA_1$ is coupled to the Controller COT which is provided with conventional level-detecting means (not shown), such as a known comparator or the like, to determine when the signal $E_{fa}$ reaches a given level $E_c$ as shown in FIG. 2b. Upon reaching that level, the Controller produces from the output of the level-detecting means a stop signal which is directed to the function generator FG, causing the ramp signal to halt with the function generator output held at the level where the sweep was stopped, as indicated in FIG. 2e. At this stage, the thermometer device has found the approximate frequency of resonance, and is conditioned to proceed with the precise determination of that frequency.

Before proceeding with that precise determination, it may be desirable first to check whether the signal from the initial detector $LA_1$ is an erroneous indication of resonance, e.g. such as the result of noise. For that purpose, the output $E_{2f}$ of the detector $LA_3$ can be compared (by conventional means, not shown, in the Controller COT) with a given level $E_s$, FIG. 2d, when the sweep has stopped as described above. If $E_{2f} < E_s$, this will be taken to mean that the initial finding of resonance was in error, and the Controller COT will signal the function generator FG to resume its highspeed sweep. If the finding of resonance is confirmed, the analysis procedure will continue through its normal course.

In this normal course of procedure, the output of the second detector $LA_2$ is analyzed to determine the precise center frequency of the resonance condition, at which the detector output is effectively zero. In certain cases, it is appropriate to determine the correct effective zero-output level for the detector, since an offset in the output can appear, as shown at $E_i$ in FIG. 2c. To determine the magnitude of $E_i$ the frequency of the oscillator MO can be lowered by an amount $\Delta f$ to a value $f_i$ remote from the coarse resonance frequency $f_c$, e.g. a frequency shift equivalent to about 0.3° C in terms of temperature. This can readily be done, for example, by arranging to Controller COT to apply a step voltage to the variable-capacitance diode $D_2$ through the resistor $r_3$ so that the oscillation frequency of the marginal oscillator MO is lowered by $\Delta f$. With the oscillator frequency at $f_i$, the output of the second detector $LA_2$ (i.e. $E_i$ of $E_f$) can then be measured and stored (as by means of a conventional sample-and-hold circuit in the Controller COT). Thereafter, conventional means in the Controller cuts off the step voltage to diode $D_2$ to restore the marginal oscillator MO to its frequency $f_c$ at which the high-speed sweep stopped.

An advantageous method of determining the precise resonance frequency $f_o$ from the output signal of the second detector $LA_2$ is to employ negative feedback techniques to drive the oscillator frequency to a value where the detector output is at null. (Note: negative feedback also is used in the above-mentioned U.S. Pat. No. 3,373,348.) The negative feedback signal can in the present embodiment be developed by the Controller COT and fed through resistor $r_3$ to the diode $D_2$. The complete loop is: Controller COT — resistor $r_3$ — oscillator MO — detector $LA_2$. The Controller COT receives the output signal from the detector $LA_2$ and compares it with the stored value $E_i$. Any deviation therebetween serves in the usual fashion as a conventional error signal causing a change in the voltage directed to diode $D_2$ and varying the oscillator frequency until the output $E_f = E_i$. The oscillation frequency of the marginal oscillator MO at which the deviation is controlled to zero through the control loop corresponds to a point where the output $E_f$ intersects the straight line $E_i$ as in FIG. 2c. The oscillator frequency at this point is equal to the resonance-absorption frequency $f_o$.

This oscillation frequency is supplied to the high-frequency amplifier RA and then counted by the counter CU. The counted result is converted into a temperature value (e.g. by known means, as in the Controller COT) and indicated on the temperature indicator IND.

For applications where the output $E_f$ of the detector $LA_2$ can have different values depending on the frequency $f$, that is, $E_i$ at frequency $f_c - \Delta f$ and $E_2$ at frequency $f_c + \Delta f$, then the negative feedback loop may be designed so that it seeks a null where the output $E_f$ is equal to the mean value:

$$E = \frac{E_i + E_2}{2}.$$

To summarize the operation of the thermometer, the detector $LA_1$, having a time constant suited for high-speed sweep, is used to detect the resonance-absorption frequency with a relatively low accuracy (e.g., about ± 0.1° C), and causing the sweep to be stopped. By using the detector $LA_3$ whose signal-to-noise ratio is high, the detection of the resonance-absorption phenomenon can be confirmed. Thereafter, the resonance-absorption frequency is determined with high accuracy by the second detector $LA_2$ whose signal-to-noise ratio also is high. This advantageously is accomplished by a negative feedback control loop comprising the detector LA2. The detected frequency is converted into a temperature and then indicated on the indicator.

The temperature detecting device of the invention makes possible automatic temperature measurement in a relatively short time, e.g. 3 minutes over a 0° to 400° C span, without the need for conventional manual operation. By confirming the resonance-absorption phenomenon by the detector $LA_3$, misoperation is minimized and measuring accuracy is increased.

Although a particular embodiment wherein three detectors are used has been described above, the invention is not limited to this arrangement. For example, a low-pass filter whose time constant is large may be added to the output stage of the detector $LA_1$, and the signals $E_{fa}$ and $E_f$ derived respectively from the two ends across the low-pass filter. Since the signal $E_f$ stands at a given level when $E_{fa} = E_c$, the need for the detectors $LA_2$ and $LA_3$ can be avoided when the resonance-absorption phenomenon is confirmed by the use of the signal $E_f$. The double-frequency component $E_{2f}$ may be used for coarsely detecting the resonance-absorption frequency, as well as for the negative feedback control. Furthermore, components other than the fundamental frequency component or the double-frequency component may be used for operation of the apparatus. Also, the operation for confirming the resonance-absorption phenomenon may be omitted, e.g. if the signal of resonance-absorption phenomenon is relatively large.

We claim:

1. A resonance thermometer comprising: a temperature-responsive resonant material; a coil arranged in said resonant material; a marginal oscillator having a resonant circuit including said coil and a variable capacitance diode; a modulator means for modulating the oscillation frequency of said marginal oscillator; a first detecting means with a short time constant for detecting a component from the modulated output of said marginal oscillator; a second detecting means with a long time constant for detecting a component from the modulated output of said marginal oscillator; a function generator means for supplying said variable capacitance diode with a signal changing in the form of ramp function and for sweeping the oscillation frequency of said marginal oscillator at high speed; and means receiving from said first and second detecting means their output signals to stop the sweep of said function generator means according to the output signal of said first detecting means and to determine the resonance-absorption frequency of said resonant material according to the output of said second detecting means.

2. A resonance thermometer in accordance with claim 1, wherein said receiving means is arranged to store an output signal ($E_i$) of said second detection means and to provide with said variable capacitance diode a control signal operable to make the output of said second detection means correspond to said stored output signal.

* * * * *